July 8, 1952　　　J. L. PETERS ET AL　　　2,602,921
AIRCRAFT TRAFFIC CONTROL SYSTEM
Filed Oct. 12, 1946　　　　　　　　　　　　　　3 Sheets-Sheet 1
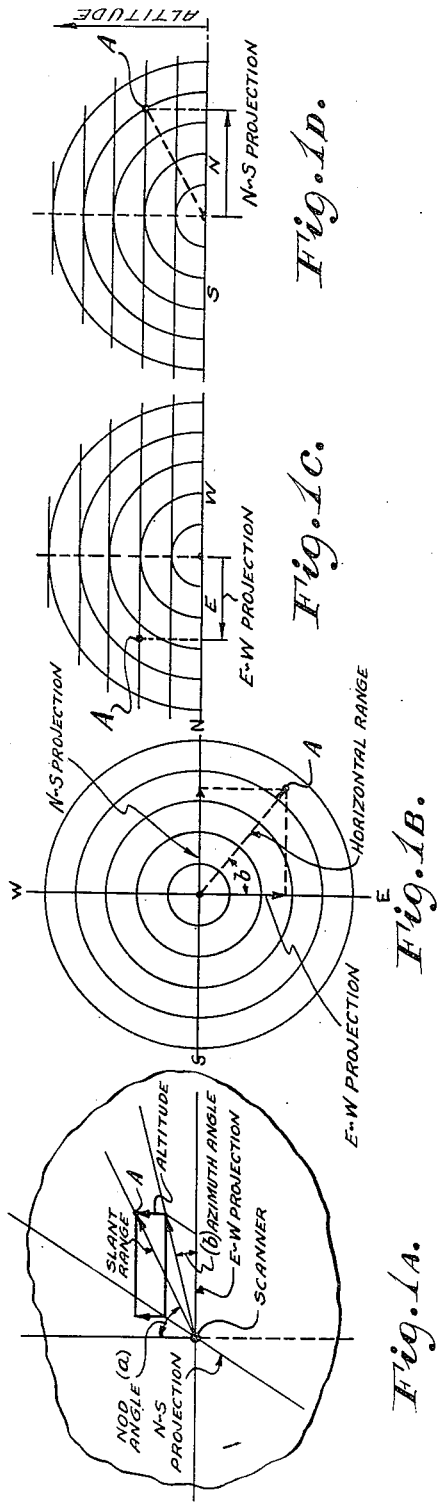
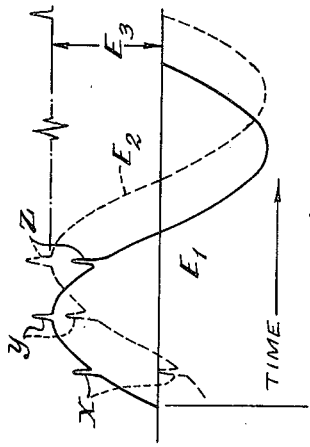
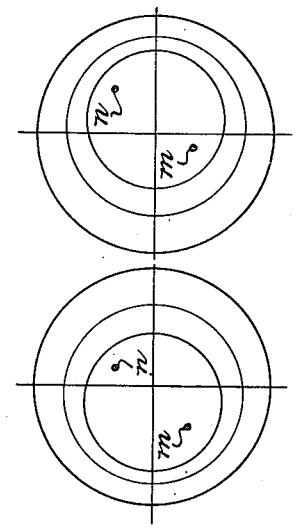
INVENTORS
JOHN L. PETERS
ERIC J. ISBISTER
BY
　　ATTORNEY July 8, 1952 J. L. PETERS ET AL 2,602,921
AIRCRAFT TRAFFIC CONTROL SYSTEM
Filed Oct. 12, 1946 3 Sheets-Sheet 2
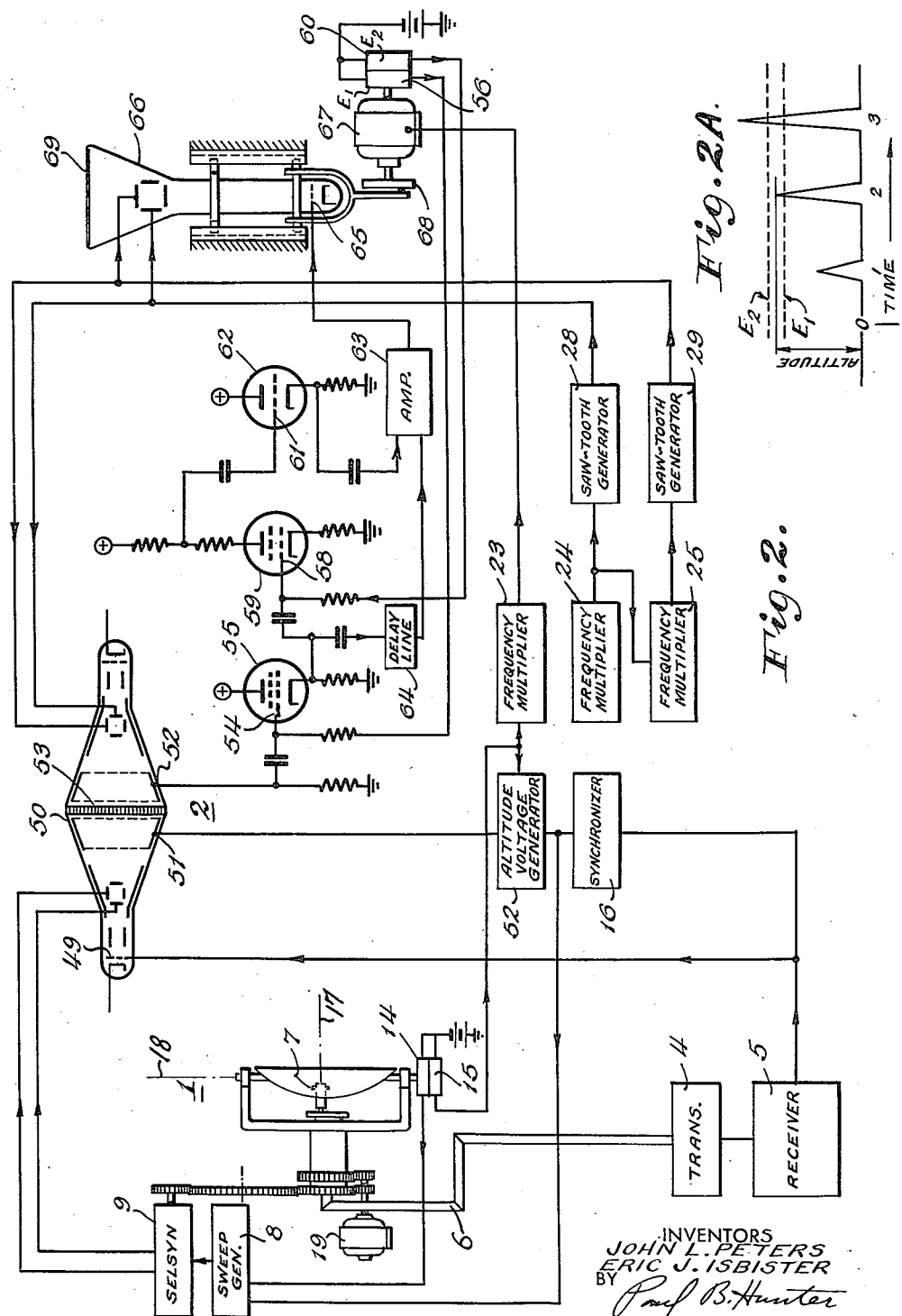
INVENTORS
JOHN L. PETERS
ERIC J. ISBISTER
BY
ATTORNEY July 8, 1952   J. L. PETERS ET AL   2,602,921
AIRCRAFT TRAFFIC CONTROL SYSTEM
Filed Oct. 12, 1946   3 Sheets-Sheet 3
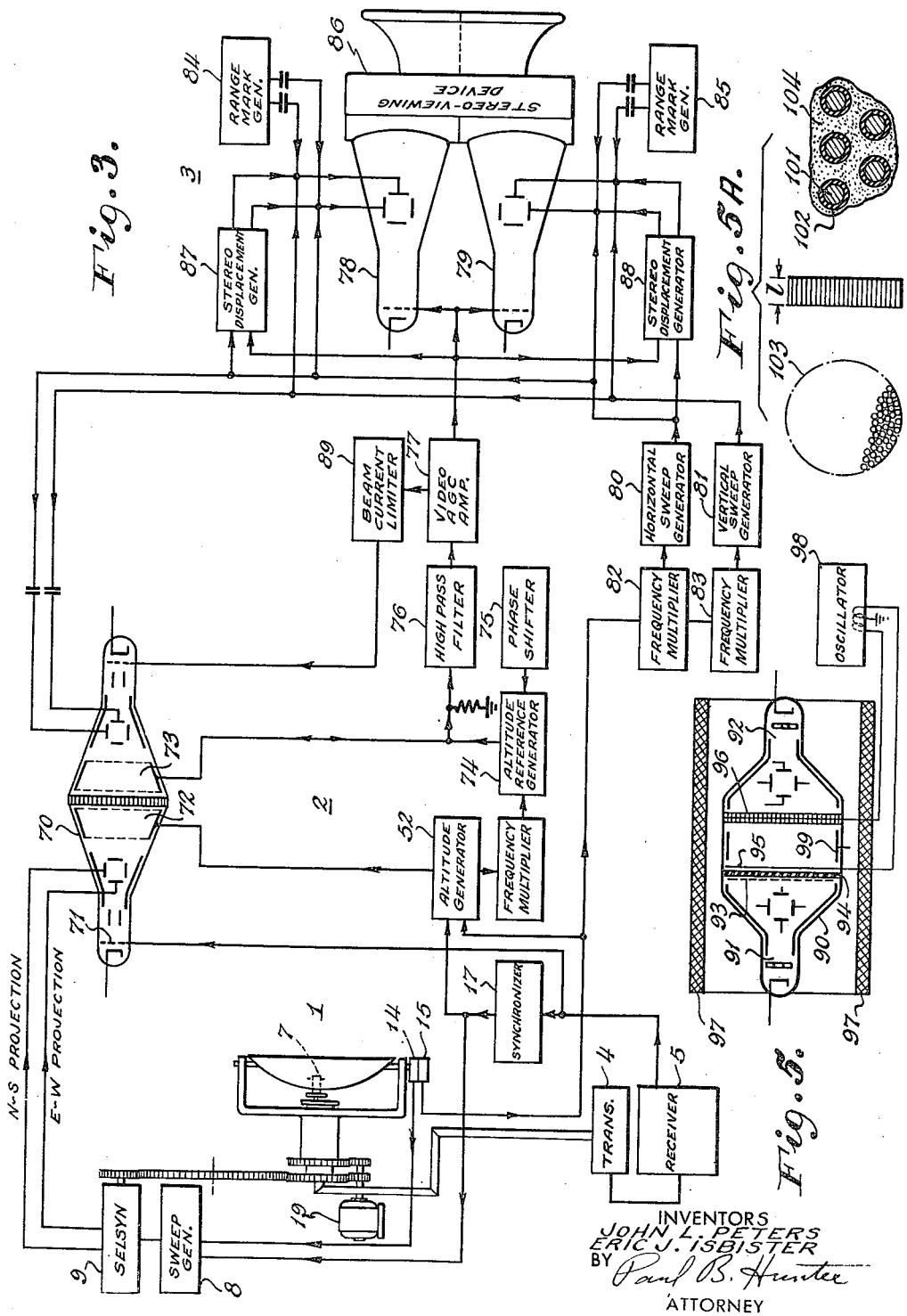
INVENTORS
JOHN L. PETERS
ERIC J. ISBISTER
BY
Paul B. Hunter
ATTORNEY Patented July 8, 1952

2,602,921

UNITED STATES PATENT OFFICE 2,602,921

AIRCRAFT TRAFFIC CONTROL SYSTEM

John L. Peters, Hempstead, and Eric J. Isbister, Garden City, N. Y., assignors to The Sperry Corporation, a corporation of Delaware Application October 12, 1946, Serial No. 703,060

6 Claims. (Cl. 343—11)

This invention relates to object locating systems having three-dimensional presentation, and more particularly to those employing radar means to scan a field of view and multi-dimensional indicating means to indicate the location of objects in said field of view.

One application of the invention is aircraft traffic control at an airport. To control the traffic at or between airports it is desirable to have a continuous and instantaneous picture of the aircraft above the airport under all visibility conditions. Radio object locating systems have been developed which will give accurate projections in any two-dimensional plane, and by viewing two projections at right angles to each other, objects may be located in three dimensions. However, the observer must attempt to correlate two entirely different patterns simultaneously in order to grasp the positional relationships of a plurality of objects in three dimensions. This procedure is quite foreign to normal visual experience and may prove confusing and ambiguous. Therefore, it is advantageous to present a single three-dimensional view, or a stereoscopic representation.

A stereoscopic effect may be produced by showing two views of the same scene having the objects therein laterally displaced in opposite directions, inversely proportionally to a function of their distance. The observer looks at one view with the left eye only, and at the other view with the right eye only and perceives the optical illusion of a third dimension.

A true three-dimensional view may be obtained by presenting a series of plane images at gradually increasing distance and oscillating the plane of the image relative to the observers in synchronism with the distance at a rate rapid enough, to form a persistent true three-dimensional image within the volume swept through by the image. A true three-dimensional picture may be viewed conveniently by more than one observer at the same time.

Accordingly, an object of this invention is to provide a radar system with a stereoscopic, or a true three-dimensional presentation.

Another object is to provide an airport traffic control system utilizing radar means adapted to present a three-dimensional picture of the space above the airport, regardless of visibility conditions.

Another object of the invention is to provide a stereoscopic radar system utilizing image storage means.

A further object of the present invention is to provide a stereoscopic radar system utilizing image storage tubes to transform from one system of scanning to another.

A still further object of the invention is to obtain scan frequency multiplication by the use of image storage tubes.

Another object of the invention is to adapt radar presentation for transmission to a remote point.

Accordingly, one embodiment of this invention is directed toward providing an airport traffic control system, which will provide a three-dimensional view of the space above the airport, comprising the following components: an image pickup means such as a radar system, image storage means and three-dimensional or stereoscopic indicating means. Other image pickup means, such as television cameras might be adapted to be used in the system.

The radar system is adaptable to scan any desired angle up to a large solid angle in a rapid manner and for this purpose the invention utilizes a microwave-type radar antenna which is adapted to spin and nod 90°, thereby spirally scanning solid angles in space from 0° to 180° or a full hemisphere. At rest position when employed for airport traffic control, the radar antenna is pointing straight up to the zenith so that, as it scans it will cover the entire sky area to the horizon in all directions, i. e., substantially a complete hemisphere. The radar system output is connected to the image storage means.

The image storage means comprises an image storage tube having a pair of cathode ray guns and a storage mosaic. The cathode ray guns may be adapted to scan the mosaic on the same side, or on opposite sides, if a two-sided mosaic is used. The function of the image storage tube is to transform from one type of scan to another and from one frequency of scan to another. For instance, one cathode ray gun may put an image on the mosaic with a circular scanning motion, such as a PPI presentation, and the same image may be taken off the mosaic by the second cathode ray gun in a conventional television scanning system utilizing horizontal line scanning.

The image storage tube may also be used to multiply the frequency of scan, which is a very important function because of the mechanical limitation on the speed of scanning the radar antenna, which is of the order of one cycle per second. Thus, the picture may be put on the mosaic at one cycle per second and taken off at say thirty cycles per second, a rate which will prevent visual flicker.

The image storage tubes may be used in a variety of ways for the above purposes. In our copending application S. N. 737,906, a continuation-in-part of the present application, a system is shown which utilizes two image storage tubes, one of which presents a ground plane, plan position indication, commonly abbreviated PPI, in polar coordinates, and the other image storage tube presents an altitude vs. north-south projection. The outputs of these two storage tubes, used as scan transformers, are then combined and applied to cathode ray tube indicating means so as to present a stereoscopic or three-dimensional indication of the area above an airport. Another arrangement in the aforementioned continuation in part employs three storage tubes. The present application deals with a system utilizing one storage tube.

The visual indicating means comprises cathode ray tube means which may be arranged to present a stereoscopic, or true three-dimensional representation which may be of several varieties.

In the embodiment of the invention previously discussed, there is shown a cathode ray tube having a fluorescent screen therein, which is adapted to oscillate along the axis of the tube in synchronism with the scanning of the storage mosaic, in the altitude direction. The screen presents horizontal projections of various different altitudes rapidly in synchronism with the altitude scanning, thereby presenting to the eye of an observer a three-dimensional picture.

Other visual cathode ray means may be used, such as an entire cathode ray tube being oscillated along its axis, the use of a rotating mirror with a plurality of offsets properly synchronized to present a true three-dimensional picture or a pair of cathode ray tubes presenting stereoscopically displaced images. These features of the invention will be discussed in detail hereafter.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other embodiments and advantages of the invention will become apparent from the following specification taken in connection with the drawings wherein:

Fig. 1 contains diagrams illustrative of the operation;

Fig. 2 is a schematic diagram of an embodiment of the invention utilizing only a single storage tube and producing a real three-dimensional image;

Fig. 3 is another schematic diagram of an embodiment of the invention utilizing a single storage tube with stereoscopic presentation;

Fig. 4 contains diagrams illustrative of the operation of the embodiment of Fig. 5;

Fig. 5 is a schematic diagram of a storage tube adapted to be used with the invention.

Reference is made to Fig. 1, wherein Fig. 1a shows a three-dimensional representation illustrative of the principles of operation. The angle "a" is the instantaneous nod angle of the antenna from the zenith, in a vertical plane. Therefore, Slant range × cosine "a" = altitude
Slant range × sine "a" = horizontal range The angle "b" is the instantaneous azimuth angle of the antenna spin in a horizontal plane. Therefore, Horizontal range × cosine "b" = east-west horizontal range projection
Horizontal range × sine "b" = north-south horizontal range projection Fig. 1b is a horizontal plane PPI presentation of the position of an object "A" in polar coordinates.

Fig. 1c is a projection of the position of the object "A" in an east-west elevation.

Fig. 1d is a projection of the position of the object "A" in a north-south elevation.

In Fig. 2, the radar components are shown in general at 1, the image storage means in general at 2, and the three-dimensional visual indicating means in general at 3.

The radar antenna 7 is adapted to spirally scan a complete hemisphere by simultaneously nodding about axis 18 and spinning about axis 17. At zero position, the antenna 7 points straight up and it periodically nods 90° to the horizon, thereby spirally scanning a complete hemisphere. The radar transmitter 4 and receiver 5 are connected to the antenna by wave guide 6.

The motor 19 is connected to the antenna 7 through suitable gearing so as to spirally scan the antenna with said simultaneous spinning and nodding motions. Two sine potentiometers 14 and 15 differing 90° in phase are attached to the nod axis of antenna 7 so that one transmits a voltage proportional to the sine of nod angle "a" and the other transmits a voltage proportional to the cosine of nod angle "a" respectively. The sine nod angle "a" output is proportional to the horizontal range projection and the cosine nod angle "a" output is proportional to the altitude, as previously mentioned.

The sine of nod angle "a" output is fed from sine potentiometer 14 to sweep voltage generator 8 and modulates the output thereof.

The sine nod angle "a" is a function of horizontal range and modulates the amplitude of the sweep voltage output of horizontal sweep generator 8 so that the output is a function of horizontal range at all times. Range synchronizer 16 is also connected to the horizontal generator 8 and synchronizes the sweep voltages with the radar transmission. The output of the sweep voltage generator 8 is connected to the rotor of selsyn 9, said rotor being also mechanically connected through suitable gearing to the radar antenna 7, so that it rotates in synchronism with the spin of the radar antenna. Therefore, the stator windings of the selsyn 9, which are 90° apart, will have outputs proportional to the sine and cosine of the azimuth angle "b," that is, the instantaneous spin angle of antenna 7, the cosine being proportional to the east-west projection of the horizontal range and the sine being proportional to the north-south projection of the horizontal range.

The image storage means 2 comprises only one storage tube 50. The radar means 1 is connected to and supplies to the storage tube 50, north-south, east-west, horizontal plane projections, all voltage in the system being coordinated by synchronizer 16. Anode 51 is placed coaxially with respect to the axis of the tube and close to the mosaic 53, the purpose being to accelerate the electron beam in proportion to the altitude.

The anode 51 is energized by a voltage proportional to the altitude, i. e., slant range X cosine "a," by the altitude voltage generator 52. The geometry of the tube 50 is arranged so that the effect of the voltage of anode 51 is to change the speed only, of the electron beam and not distort its direction.

The function of grid 49 may be considered similar to that of a switch, i. e., beam electrons flow only when an echo signal is applied to the grid 49.

The output of image storage tube 50 is scanned in a conventional television manner by voltages generated by sweep generators 28 and 29 and the video output of tube 50 is picked up by anode 52. The instantaneous amplitude of this output is proportional to altitude and is applied to a selective circuit comprising three vacuum tubes for the purpose of selecting signals of the right altitude in synchronism with the indicating means. The scanning voltages are multiplied to convenient frequencies by frequency multipliers 23, 24 and 25.

The altitude selective circuit operates in the following manner. Suppose at a certain instant, anode 52 picks up three signals, 1, 2 and 3 as shown in Fig. 4A, and it is desired to select the signal at the indicated altitude, that is, signals lying between $E_1$ and $E_2$, in this case signal 2. These three signals are applied from anode 52 to the grid 54 of vacuum tube 55, which grid 54 is supplied a negative biasing voltage equal to $E_1$ which is proportional to altitude at all times, from the rotating potentiometer 56. Potentiometer 56 is driven by motor 67 in synchronism with the instantaneous altitude indications of indicating tube 66.

Said grid 58 is negatively biased by a voltage equal to $E_2$ by rotating potentiometer 60, which voltage is also proportional to altitude at all times. This bias voltage $E_2$ is greater than signal 2 and therefore signal 2 is eliminated and the only output of tube 59 will be signal 3 which is inverted 180° in phase by the action of the tube 59.

This voltage $E_3$ is applied to the grid 61 of tube 62 which is a cathode follower and it is taken off the cathode of said tube in the same phase and applied to the video amplifier 63. Signals 2 and 3 are also applied from the cathode output of tube 55 through delay line 64 to the video amplifier 63.

The purpose of the delay line 64 is to delay signal 3 slightly so that the signal 3 from tube 55 and the clipped inverted signal 3 from tube 62 will cancel each other out leaving as the output of video amplifier 63, only signal 2 which was the signal at the desired altitude.

The output of video amplifier 63, in this case signal 2, is applied to the grid 65 of the indicating cathode ray tube 66, which is connected thereto, thereby intensity-modulating the beam thereof.

The cathode ray tube 66 is adapted to oscillate along the axis of the cathode ray tube in synchronism with the altitude indication in response to motor 67 and cam 68. The indicating screen 69 is scanned at the same voltages as the output beam of tube 50. Therefore, tube 66 will present successive horizontal plane images of various altitudes in rapid succession, thereby presenting to the eye of an observer a true three-dimensional picture of the area above the airport.

As previously mentioned, biasing voltages $E_1$ and $E_2$ are supplied from potentiometers driven by motor 67 in synchronism with the altitude indication of indicator tube 66. Therefore, these biasing voltages will always select signals of an amplitude corresponding to the altitude that the screen is showing at that instant.

Fig. 3 discloses a fourth embodiment of the invention which is similar to the embodiment of Fig. 2 except that the indicating means employ a pair of cathode ray tubes presenting stereoscopically displaced images through a stereoscopic viewing device.

Reference is also made to Fig. 4 which shows several diagrams illustrative of the operation of the circuit of Fig. 3.

The radar means as shown in general at 1 are similar to the radar means of Fig. 2. The image storage means shown in general at 2 consist of a storage tube 70, similar to the one of Fig. 2 in which the input cathode ray beam scanning means is altitude-modulated by altitude generator 52 which supplies to anode 72 a voltage proportional to the altitude. The video output of the image storage tube 70 is picked up by anode 73 and is superimposed on an altitude reference voltage supplied by the altitude reference generator 74, as shown in Fig. 4D.

The altitude reference voltage E, in Fig. 4D is phase-shifted by phase shifter 75 in synchronism with the output scanning of tube 70 in the altitude direction. By shifting the phase of the altitude reference voltage, a signal at the altitude being viewed at a given instant may be made the strongest positive signal. The altitude reference voltage is of the for shown in Fig. 4D as $E_1$, wherein it is represented with several video signals "x", "y" and "z" superimposed on it.

At one instant, signal "x" is the signal at the altitude that is being scanned and it is selected from the others by applying a proper biasing voltage $E_3$ to the video amplifier 77. At the next instant, signal "z" is the desired and selected signal, as shown by the dotted altitude reference voltage $E_2$, which has been phase-shifted by the operation of phase shifter 75.

The altitude reference voltage is then filtered out by the high pass filter 76 and the selected video signals are amplified by amplifier 77 and applied to the control grids of cathode ray tubes 78 and 79. These selected signals are displaced stereoscopically on the screens of cathode ray tubes 78 and 79 proportionally to their altitude by the operation of displacement generators 87 and 88.

The beam current limiter 89 limits the output beam current of storage tube 70. The deflecting plates of the stereoscopic cathode ray tubes 78 and 79 are scanned by the same voltages as scan the output of storage tube 70. These voltages are supplied by sweep generators 80 and 81 in response to frequency multipliers 82 and 83.

Circular range marks, such as shown in Figs. 4B and 4C, are applied to the cathode ray indicating tubes by range mark generators 84 and 85.

To produce a stereoscopic effect with the images appearing on the screens of cathode ray tubes 78 and 79, the objects appearing in these two images are deflected in opposite directions proportionally to a function of their altitude in response to voltages from stereoscopic displacement generators 87 and 88. The image of cathode ray tube 78 which will be viewed by the observers right eye is proportionally deflected to the right as shown in Fig. 4C and the image on cathode ray tube 79 which will be viewed by the observer's left eye 36 is deflected to the left as shown in Fig. 4B. The signals "m" and "n" shown in Figs. 4B and 4C are the signals as shown in Fig. 4A but have been displaced in opposite directions proportionally to a function of their altitude.

These double images are then viewed by the observer through stereoscopic viewing device 86 and will present to the observer the illusion of a third dimension, namely altitude, according to the well-known principles of stereoscopy.

Fig. 5 discloses a storage tube which may be used in the embodiments of the invention. In this storage tube, the charges on the double-sided mosaic are continually renewed so that a large output to input scanning frequency ratio may be attained. The operation of the tube is on the electron multiplier principle, that is having the electrons within the storage section of the tube oscillating back and forth and releasing additional secondary electrons by repeated impacts.

Considering Fig. 5 in more detail, there is shown a storage tube 90 having input and output electron guns 91 and 92. The input electron gun 91 is adapted to scan a fluorescent screen 93 which is suitably mounted on a thin support 94 which may be a sheet of mica. A semi-transparent photocathode 95 is mounted on the other side of the support 94 and a double-sided mosaic 96 is spaced between the photocathode 95 and the output electron scanning means 92.

A magnetic focussing coil 97 is used to focus the electron paths in the multiplier section. A positive direct current accelerating potential is introduced between the photocathode 95 and the double-sided mosaic 96 by anode 99. A short magnetic coil having a sharp field might be used.

Radio frequency energy is applied by oscillator 98 between the photocathode 95 and the double-sided mosaic 96.

The spacing between the photocathode 95 and the double mosaic 96 is arranged so that the time of flight of electrons between these two electrodes will substantially coincide with a multiple half-period of the said oscillator 98.

Thus, it is seen that the charges on the double-sided mosaic are continually renewed by the electron multiplier, and the output of the storage tube may be scanned as rapidly as desired.

The operation of the tube is as follows; the original signals at a relatively slow rate, say, once per second, are put on the fluorescent screen 93 by the input electron scanning means 91. The light from the fluorescent screen 93 excites the photocathode 95, causing it to emit electrons. This photo emission is accelerated by the positive electrode 99, which is placed between the photocathode 95 and the double-sided mosaic 96, and is focussed on the mosaic by the external magnetic coil 97. The charges thus placed on the double-sided mosaic corresponding to the original signals on the fluorescent screen are picked off the output side of the mosaic at many times per second as needed. The charges on the input side of the double-sided mosaic 12 are continually renewed by the R. F. energy accelerating the secondary electrons back and forth in accordance with the electron multiplier principle.

Suitable blanking voltages may be applied periodically to discharge the mosaic, that is, erase the picture so that no blurring effect will be seen on the viewing tube. For instance, at the end of a convenient number of output scanning operations, the output anode voltage of the image storage tube may be increased and the signal output from the storage tube simultaneously cut off for one complete scanning cycle of a uniform intensity beam, to thereby discharge the mosaic completely.

Referring to Fig. 5A, there is shown a type of double-sided mosaic which may be used with the embodiments of the invention previously described. Due to the high scanning rates used in the invention, it is desirable to provide a double-sided mosaic whose elements have more capacitance than generally provided by mosaics of the prior art. This mosaic comprises a number of parallel lengths of wire which have been insulated, such as anodized aluminum wire, supported in a frame by a solid conducting material such as aquadag which also serves as a common ground. Each element of the mosaic, that is, each wire, will have a certain capacity to ground, each capacitor being formed by the conducting material, or wire 100, the insulating material 101 and the conducting supporting material 104, in this case the aquadag, which provides a common ground for all the elements. The capacity of each element is directly proportional to the length $l$ of the wires, and may be conveniently proportioned to have the right value.

While the invention has been described as applied to aircraft traffic control at an airport, it is not limited to such but may be adapted to other uses such as guided missile control or defense, military fighter plane direction and various other uses. In addition, the system is easily adaptable to blank out indications from all but one or more altitude or distance regions and in this manner one altitude or distance region of special interest may be selected and presented free from interference at other distances.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Three-dimensional object locating means comprising a radar system including a radio pulse transmitter, a reflected pulse receiver, and antenna means cooperating with said transmitter and receiver and provided with directional scanning means for regularly scanning throughout a space volume, said radar system being capable of denoting object direction and distance according to the timing of reception of reflected pulses relative to the transmitted pulses and also relative to the scanning cycle of the directional antenna system; stereoscopic indicating means responsive to said radar system comprising at least one image storage tube having two cathode ray beam scanning means and a mosaic storage element; first and second image presentation cathode ray indicators; and means responsive to one of said cathode ray beam scanning means for producing first and second stereoscopic representations of said located objects on the respective ones of said image presentation cathode ray indicators to be viewed by the left and right eyes, respectively, of the observer.

2. Three-dimensional object locating means comprising a radar system including radio pulse transmitting and receiving means and directional scanning means and received pulse timing means, stereoscopic indicating means responsive to said radar system comprising an electron-sensitive screen, an image signal storage tube having a storage mosaic and input beam scanning means and input beam accelerating means adapted to accelerate said electron beam proportionally to slant range to thereby deposit on said mosaic an electron-charge representation of the three-dimensional optical image, output means responsive to the electrical charge distribution on said mosaic for producing on said electron-sensitive screen a succession of images and for oscillating said electron-sensitive screen relative to an observer proportionally to radar range to thereby present a three-dimensional view.

3. A three-dimensional image signal storage system comprising an electron image signal storage tube having a pair of cathode ray beam scanning means and an electron charge storage mosaic common to both scanning means and adapted to store an electronic representation of an optical projection of objects, and radio object position detection means coupled to one of said cathode ray beam scanning means for varying the distribution and intensity of electron charges on said mosaic according to the object positions, said radio object position detection means and said one of said cathode ray beam scanning means including means for positioning image signal charges on said storage mosaic according to first and second coordinates of object position as derived from said radio position detection means, and means for varying the intensity of said image signal charges according to the third coordinate of object position as derived from said radio object detection means.

4. Object position indicating apparatus comprising radio object distance and direction responsive means for periodically scanning throughout a predetermined volume of space and detecting reflected energy signals representing the positions of energy reflecting objects, an image signal storage device having an electronically actuatable mosaic and first and second cathode ray beam means for scanning said mosaic, means responsive to said radio object distance and direction means and operably coupled to said first cathode ray beam means for scanning said mosaic in synchronism with the scanning of said space volume and varying the electron distribution on said mosaic according to signal variations of energy reflected from the reflecting objects, stereo image portraying means including a scanning device, and means coupled to said second cathode ray beam means and to said stereo image portraying means for providing synchronized scan between said second cathode ray beam means and said stereo image portraying means in accordance with said variations of electron distribution on said mosaic, said stereo image portraying means comprising a pair of cathode ray tubes, stereoscopic viewing means for presenting the views of the respective ones of said tubes to the respective eyes of an observer, and means operable according to electron intensity on said mosaic in the region scanned by said second cathode ray beam means for controlling the relative displacement between corresponding portions of the images presented on said pair of cathode ray tubes.

5. Object detecting and indicating apparatus for presenting an apparent three-dimensional view of objects in a space region, comprising means including a radio transmitting and receiving system for providing output signals representing the direction and distance of remote energy-reflecting elements, means responsive thereto for receiving and storing an electrical representation of a three-dimensional optical image of said reflecting elements, said last-named means comprising an electronic image storage tube having a mosaic and means responsive to said output signals for distributing electron charges in first and second directions on said mosaic and in relative intensities according to three respective coordinates of object position in space, and presentation means coupled to said receiving and storing means and including electron density selective means for scanning said mosaic and for presenting an apparent three-dimensional image to an observer of the energy-reflecting elements in accordance with variations of output of said mosaic scanning means.

6. Object position indicating apparatus as defined in claim 5 wherein said presentation means comprises a cathode ray tube having an electron beam responsive screen, and means for regularly varying the observation distance between a selected viewpoint and said screen at a recurrence frequency sufficiently high for persistence of vision, and said means for synchronously scanning said second cathode ray beam means and said image presentation means includes means for selectively transferring to the cathode ray beam of said oscilloscope electron charges from said mosaic of intensity related in a predetermined manner to the viewpoint distance, the selected intensity being varied synchronously with the variation of the said viewpoint distance.

JOHN L. PETERS.
ERIC J. ISBISTER.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,065,570 | Easig | Dec. 29, 1936 |
| 2,219,021 | Riesz | Oct. 22, 1940 |
| 2,285,848 | Van Den Bosch | June 9, 1942 |
| 2,361,390 | Ferrill | Oct. 31, 1944 |
| 2,408,050 | De Rosa | Sept. 24, 1946 |
| 2,412,669 | Bedford | Dec. 17, 1946 |
| 2,426,979 | Ayres | Sept. 9, 1947 |
| 2,429,772 | Roma | Oct. 28, 1947 |
| 2,430,038 | Wertz | Nov. 4, 1947 |
| 2,434,897 | Ayres | Jan. 27, 1948 |
| 2,437,173 | Rutherford | Mar. 2, 1948 |
| 2,491,450 | Holmes | Dec. 13, 1949 |
| 2,501,748 | Streeter | Mar. 28, 1950 |
| 2,508,358 | Ayres | May 23, 1950 |